(12) United States Patent
Kim et al.

(10) Patent No.: US 8,060,020 B2
(45) Date of Patent: Nov. 15, 2011

(54) APPARATUS AND METHOD FOR REMOVING INTERFERENCE SIGNAL USING SELECTIVE FREQUENCY PHASE CONVERTER

(75) Inventors: Seong Do Kim, Daejeon (KR); Ja Yol Lee, Daejeon (KR); Jae Hoon Shim, Daejeon (KR); Hyun Kyu Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 232 days.

(21) Appl. No.: 12/628,684

(22) Filed: Dec. 1, 2009

(65) Prior Publication Data

US 2010/0144281 A1    Jun. 10, 2010

(30) Foreign Application Priority Data

Dec. 4, 2008 (KR) .................. 10-2008-0122209
Mar. 31, 2009 (KR) .................. 10-2009-0027316

(51) Int. Cl.
*H04B 1/00* (2006.01)
(52) U.S. Cl. ............ 455/63.1; 455/296; 455/278.1; 455/135; 455/67.13; 375/346
(58) Field of Classification Search .......... 455/63.1, 455/296, 278.1, 135, 67.13; 375/346
See application file for complete search history.

(56) References Cited

U.S. PATENT DOCUMENTS

| 7,266,062 B2 * | 9/2007 | Kurihara | 369/47.44 |
| 7,796,967 B2 * | 9/2010 | Okada | 455/296 |
| 2004/0136289 A1 | 7/2004 | Kurihara | |
| 2009/0061805 A1 * | 3/2009 | Kim et al. | 455/296 |

FOREIGN PATENT DOCUMENTS

KR   10-2008-0056599 A   6/2008

OTHER PUBLICATIONS

Hooman Darabi, "A Blocker Filtering Technique for SAW-Less Wireless Receivers", IEEE Journal of Solid-State Circuits, Dec. 2007, pp. 2766-2773, vol. 42, No. 12.
Bernard Tenbroek et al., "Single-Chip Tri-Band WCDMA/HSDPA Transceiver without External SAW Filters and with Integrated TX Power Control", 2008 IEEE International Solid-State Circuits Conference, ISSCC 2008 / Session 10 / Cellular Transceivers / 10.2, 2008, pp. 202-203, 607.

* cited by examiner

*Primary Examiner* — Sanh Phu

(57) ABSTRACT

An apparatus and method for removing an interference signal using a selective frequency phase converter are disclosed. The apparatus for removing an interference signal using a selective frequency phase converter includes: a first phase converter configured to convert a phase of a received RF signal to differentially output first and second signals having a phase difference of 180° from each other; a second phase converter configured to receive the first signal and selectively convert the phase of a particular frequency band; a third phase converter configured to receive the second signal and selectively convert the phase of a particular frequency band; a timing controller configured to correct a signal delay time between the output from the second phase converter and that of the third phase converter; and an adder configured to add an output from the second phase converter and an output from the third phase converter, wherein the second and third phase converters phase-convert the first and second signals such that the phases of the signals of the particular frequency bands do not have a phase difference of 180° from each other.

8 Claims, 3 Drawing Sheets

APPARATUS AND METHOD FOR REMOVING INTERFERENCE SIGNAL USING SELECTIVE FREQUENCY PHASE CONVERTER

CROSS-REFERENCE TO RELATED APPLICATIONS

This application claims the priorities of Korean Patent Application Nos. 10-2008-0122209 filed on Dec. 4, 2008 and 10-2009-0027316 filed on Mar. 31, 2009, respectively, in the Korean Intellectual Property Office, the disclosures of which are incorporated herein by reference.

BACKGROUND OF THE INVENTION

1. Field of the Invention

The present invention relates to an apparatus and method for removing interference signals using a selective frequency phase converter (or phase shifter) and, more particularly, to an apparatus for effectively removing interference signals by selectively phase-converting a signal of a particular frequency band by using simple hardware.

2. Description of the Related Art

An RF signal received in a wireline/wireless communication system includes signals from unnecessary frequency bands as well as signals from the necessary particular frequency band, and such undesired and unnecessary signals from other frequency bands are known as interference signals. Because most interference signals include signals generated by other systems, they have considerably powerful signal power strength, making the operation of electronic parts of a receiver system enter a saturated state, which can result in degradation of receiver performance. Thus, in order to ensure the stable operation of a receiver system, the strength of the interference signals must be attenuated to below a certain level in a front stage of a receiver. In addition, as an ideal communication system is supposed to only receive a signal of a particular required band, the removal of interference signals is closely connected with the performance of the communications system.

The related art method for removing interference signals includes a method of using a band pass filter, a method of using a notch filter, a feed-forward method, and various others.

The method of using a band pass filter allows a received signal to pass through a band pass filter having a pass band including a particular required frequency band. In this method, signal loss occurs to some extent even in the pass band, due to the non-ideal characteristics of the band pass filter, leading to an attenuation of even the signals of the particular required frequency band. In addition, in order to use the band pass filter, an external element must be mounted in the system, increasing the size of the system.

The method of using a notch filter allows a received signal to pass through a notch filter that removes signals of a certain range of frequency band. This method is effective for removing interference signals present in a narrow frequency band, but has difficulty in removing interference signals distributed across a wide frequency band.

The feed-forward method is where a received signal is first down-converted, such that its particular required frequency band is positioned at a baseband, namely, in the vicinity of DC, and allowed to pass through a high pass filter to remove a signal of particular required frequency band. The resultant signal's phase is then converted (i.e., shifted) by 180°, which is then up-converted so as to be added to the originally received signal, thus removing interference signals. This method is advantageous in that signal loss is minimal and interference signals across a wide frequency band can be effectively removed, however, the hardware configuration is complicated due to the fact that a down-converter and up-converter as well as a high pass filter must necessarily be used.

SUMMARY OF THE INVENTION

An aspect of the present invention provides an apparatus and method for removing an interference signal using a selective frequency phase converter capable of reducing a signal loss of a particular required frequency band by using only simple hardware without using a band pass filter, and effectively removing interference signals from every frequency band.

According to an aspect of the present invention, there is provided an apparatus for removing an interference signal using a selective frequency phase converter, including: an antenna configured to receive an RF signal; a first phase converter configured to convert a phase of the received RF signal to differentially output first and second signals having a phase difference of 180° from each other; a second phase converter configured to receive the first signal and selectively convert the phase of a particular frequency band; a third phase converter configured to receive the second signal and selectively convert the phase of a particular frequency band; and an adder configured to add an output from the second phase converter and an output from the third phase converter, wherein the signal of the particular frequency band output from the second phase converter and the signal of the particular frequency band output from the third phase converter do not have a phase difference of 180° from each other.

The apparatus for removing an interference signal using the selective frequency phase converter may further include: a timing controller configured to correct a signal delay time between the output from the second phase converter and that of the third phase converter.

According to an aspect of the present invention, there is provided a method for removing an interference signal using a selective frequency phase converter, including: receiving an RF signal via an antenna; converting a phase of the received RF signal to differentially output first and second signals having a 180° phase difference from each other; selectively converting only the phase of particular frequency bands of the first and second signals so that a signal of the particular frequency band of the first signal and a signal of the particular frequency band of the second signal do not have a 180° phase difference from each other; and adding the selectively phase-converted first and second signals.

The method for removing an interference signal using a selective frequency phase converter may further include: correcting a signal delay time caused as the first and second signals are selectively phase-converted.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
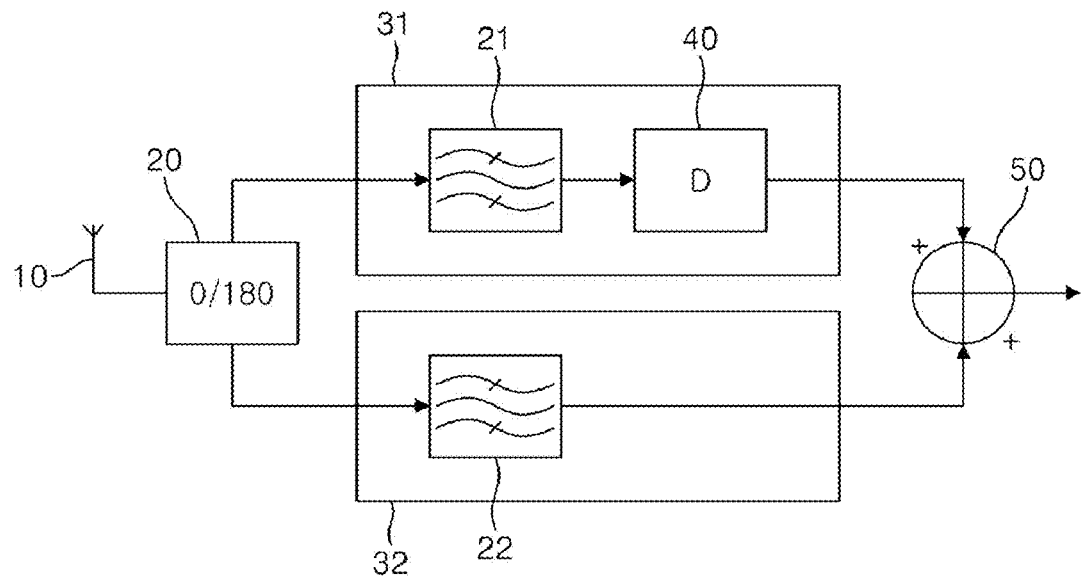
FIG. 1 is a schematic block diagram of an apparatus for removing an interference signal using a selective frequency phase converter.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

It will be understood that when an element is referred to as being "connected to" another element, it can be directly connected to the other element or intervening elements may also be present. In contrast, when an element is referred to as being "directly connected to" another element, there are no intervening elements present. In addition, unless explicitly described to the contrary, the word "comprise" and variations such as "comprises" or "comprising," will be understood to imply the inclusion of stated elements but not the exclusion of any other elements.

The operational concept of the present invention is as follows.

When two signals which have the same form but also have mutually different phases by 180° are added together, the signals are canceled out altogether and disappear. Thus, if a particular signal is output as two phase-converted signals such that they have a mutual phase difference of 180° at every frequency band, and the two signals are then added together, they are canceled out and disappear.

Based on this principle, in the present invention, a received signal is primarily phase-converted at every frequency band so as to be output as two signals having a 180° phase difference from each other. Of the two signals, only signals of a particular frequency band, namely, a relatively narrow band, are selectively phase-converted (i.e., phase-shifted) such that they do not have a phase difference of 180° from each other, after which the two signals are added. Thus, interference signals, present in every frequency band, excluding the particular frequency band, are effectively removed without using a pass band filter or the like.

In this case, the signals of the particular frequency band of the two signals preferably have an in-phase from each other, for which a particular frequency band of one of the two signals may be selectively phase-converted by x degrees while that of the other remaining one may be phase-converted by (x−180) degrees.

A method and apparatus, by which an RF signal is received and output as a first signal without being phase-converted and a second signal phase-converted by 180° at every frequency band, and a signal of a particular frequency band of the first signal is selectively phase-converted by −90° and a signal of a particular frequency band of the second signal is selectively phase-converted by 90° to thus remove interference signals, according to an exemplary embodiment of the present invention will now be described.

FIG. 1 is a schematic block diagram of an apparatus for removing an interference signal using a selective frequency phase converter.

With reference to FIG. 1, the apparatus for removing an interference signal using a selective frequency phase converter according to an exemplary embodiment of the present invention includes an antenna 10, a first phase converter 20, a second phase converter 21, a third phase converter 22, a timing controller 40, and an adder 50. The second phase converter 21 constitutes a first path 31 along with the timing controller 40, and the third phase converter 22 constitutes a second path 32.

The first phase converter 20, which outputs a single signal as two signals mutually having a 180°-phase difference, may be implemented by using a single-to-differential converter or a passive transformer element.

The second and third phase converters 21 and 22, which selectively phase-convert only a particular frequency band of a signal, may be implemented by applying a multi-phase filter or the like.

The antenna 10 is an element for receiving an RF signal and providing the received signal as an input to the first phase converter 20.

Figure 2:
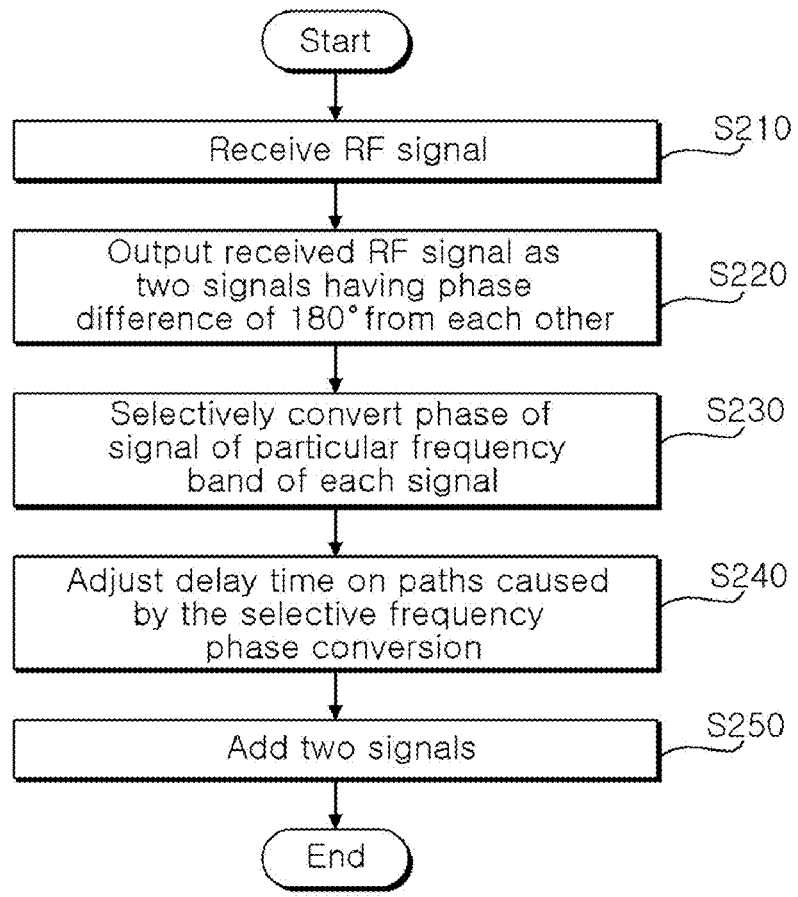
FIG. 2 is a flow chart illustrating a method for removing an interference signal using a selective frequency phase converter.

FIG. 2 is a flow chart illustrating a method for removing an interference signal using a selective frequency phase converter.

With reference to FIG. 2, in operation 5210, an RF signal is received.

In operation 5220, the received RF signal is converted to differentially output first and second signals having a 180° phase difference from each other.

In operation 5230, the phase of a signal of a particular frequency band of the first signal is selectively converted by a certain size, the phase of a signal of a particular frequency band of the second signal is selectively converted by a certain size. Preferably, the phase of the signal of the particular frequency band of the first signal is converted by −90°, and the phase of the signal of the particular frequency band of the second signal is converted by 90°.

In operation 5240, after the first and second signals have been selectively phase-converted, a delay time is corrected on the paths between the selectively phase-converted two signals.

In operation 250, the selectively phase-converted first and second signals are added.

Figure 3:
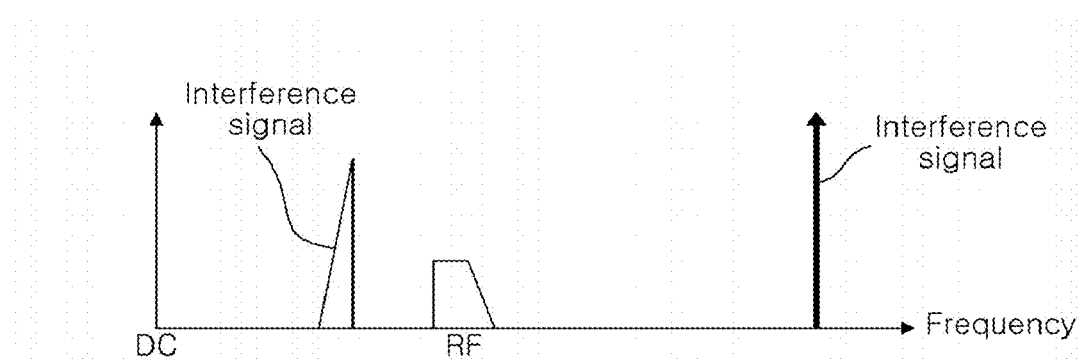
FIG. 3 is a graph showing a received RF signal appearing in a frequency domain.

FIG. 3 illustrates the RF signal received via the antenna 10. As shown in FIG. 3, the received RF signal includes both a signal of a required frequency band and an interference signal.

The first phase converter 20 differentially outputs the RF signal, which has been received via the antenna 10, as a first signal whose phase has not been converted in any frequency band and a second signal whose phase has been converted by 180° in every frequency band. The first signal is provided as an input to the first path 31 and the second signal is provided as an input to the second path 32.

Figure 4A:
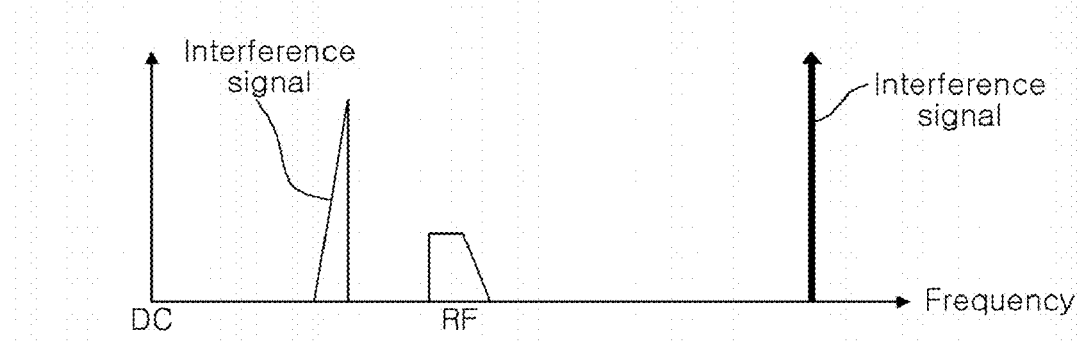
FIG. 4A is a graph showing a first signal which has not been phase-converted in any frequency band.
Figure 4B:
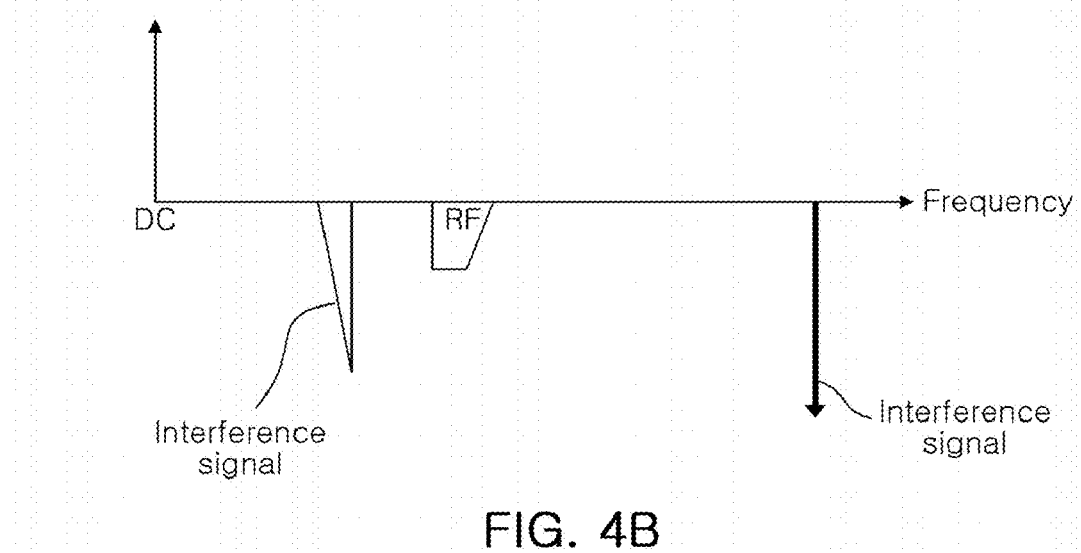
FIG. 4B is a graph showing a second signal phase-converted by 180° in every frequency band.

FIG. 4A illustrates the first signal which has not been phase-converted in any frequency band, and FIG. 4B illustrates the second signal phase-converted by 180° in every frequency band.

The second phase-converter 21 receives the first signal, selectively phase-converts only the signal of the particular required frequency band by −90°, and provides the same to the timing controller 40.

Figure 5A:
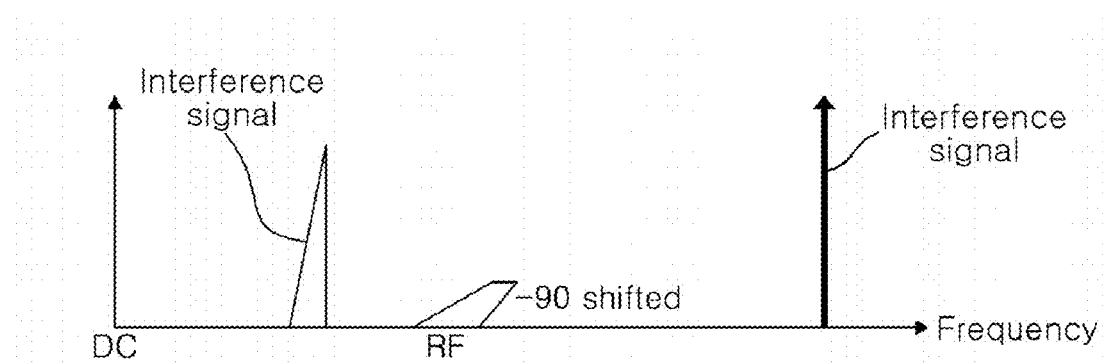
FIG. 5A is a graph showing a first signal selectively phase-converted by −90° only in a particular frequency band.

FIG. 5A illustrates the first signal of which only the signal of the particular required frequency band has been selectively phase-converted by −90° by the second phase converter 21. As shown in FIG. 5A, the signal of the particular required frequency band has a phase of −90°, and the signal of a remaining frequency band has a phase of 0°.

The third phase converter 22 receives the second signal, selectively phase-converts only the signal of the particular required frequency band by 90°, and provides the same to the adder 50.

Figure 5B:
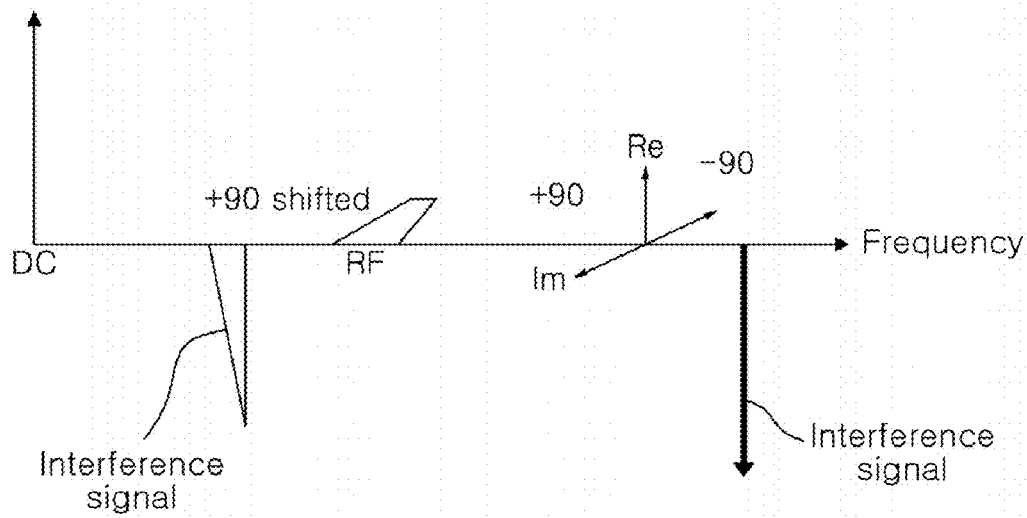
FIG. 5B is a graph showing a second signal selectively phase-converted by 90° only in a particular frequency band.

FIG. 5B illustrates the second signal of which only the signal of the particular required frequency band has been selectively phase-converted by 90° by the third phase converter 22. As shown in FIG. 5B, the signal of the particular required frequency band has the phase of −90° and the signal of the remaining frequency band has a phase 180°.

Upon receiving the output from the second phase converter 21, the timing controller 40 corrects a delay time between the output of the second phase converter 21 and that of the third phase converter 22.

The adder 50 serves to add the output signals on the first path 31 and the second path 32. The outputs of the adder 50 correspond to the entire output of the apparatus for removing an interference signal using the selective frequency phase converter.

Figure 6:
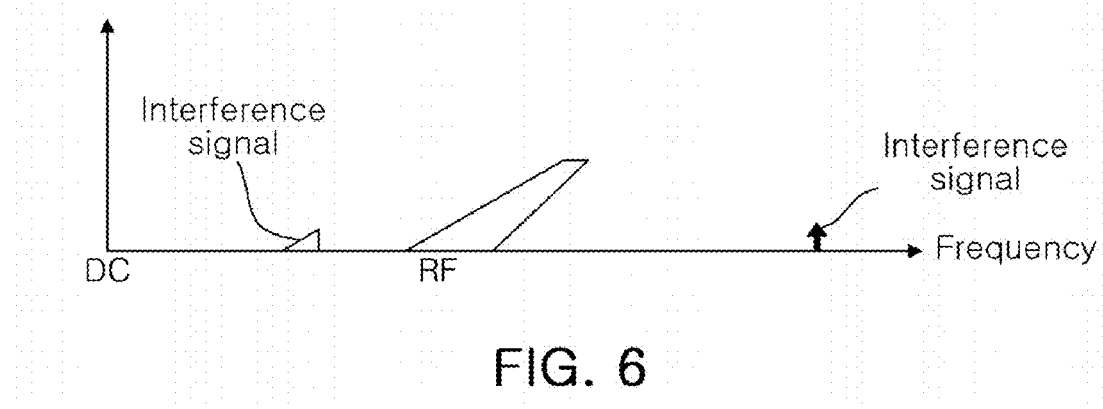
FIG. 6 is a graph showing a signal obtained by adding the selectively phase-converted first and second signals.

FIG. 6 illustrates the signal obtained by adding the output signals on the first path 31 and the second path 32 by means of the adder 50. As shown in FIG. 6, the interference signals have been removed, and only the signal of the particular required frequency band is an output signal of the adder 50.

In this manner, only the signal of the desired particular band is selectively phase-converted to thus effectively remove the interference signals at every frequency range by using only a simple hardware configuration.

As set forth above, according to exemplary embodiments of the invention, because the apparatus for removing an interference signal using a selective frequency phase converter does not use a band pass filter, signal loss is minimal.

Also, because the differential amplification principle is in use, interference signals existing in a wide frequency band as well as in a narrow frequency band can be effectively removed.

In addition, because the interference signal removing apparatus includes several components such as a phase converter, an adder, a time controller, etc., without using a band pass filter or an up-converter/down-converter, the hardware configuration is simplified.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for removing an interference signal using a selective frequency phase converter, the apparatus comprising:
    a first phase converter configured to convert a phase of a received RF signal in order to differentially output first and second signals having a phase difference of 180° from each other;
    a second phase converter configured to selectively convert the phase of a signal of a particular frequency band in the first signal by a certain size;
    a third phase converter configured to selectively convert the phase of a signal of a particular frequency band in the second signal by a certain size; and
    an adder configured to add an output from the second phase converter and an output from the third phase converter,
    wherein the signal of the particular frequency band output from the second phase converter and the signal of the particular frequency band output from the third phase converter do not have a phase difference of 180° from each other.

2. The apparatus of claim 1, further comprising:
    a timing controller configured to correct a delay time on paths between the output from the second phase converter and the output from the third phase converter by adjusting the output from the second phase converter, and provides the same to the adder.

3. The apparatus of claim 1, wherein the first phase converter is implemented by using a single-to-differential converter or a passive transformer element.

4. The apparatus of claim 1, wherein the second and third phase converters are implemented by using a multi-phase filter.

5. The apparatus of claim 1, wherein the second phase converter converts the phase of the signal of the particular frequency band of the first signal by −90°, and the third phase converter converts the phase of the signal of the particular frequency band of the second signal by 90°.

6. A method for removing an interference signal using a selective frequency phase converter, the method comprising:
    receiving an RF signal;
    converting a phase of the received RF signal to differentially output first and second signals having a 180° phase difference from each other;
    selectively converting the phase of a signal of a particular frequency band of the first signal by a certain size;
    selectively converting the phase of a signal of a particular frequency band of the second signal by a certain size; and
    adding the selectively phase-converted first and second signals,
    wherein after the first and second signals have been selectively phase-converted, the signal of the particular band of the first signal and the signal of the particular frequency band of the second signal do not have a 180° phase difference from each other.

7. The method of claim 6, further comprising:
    after the first and second signals have been selectively phase-converted, correcting a delay time on the paths between the selectively phase-converted two signals.

8. The method of claim 6, wherein the phase of the signal of the particular frequency band of the first signal is converted by −90°, and the phase of the signal of the particular frequency band of the second signal is converted by 90°.

* * * * *